United States Patent
Westergaard

(10) Patent No.: US 10,677,221 B2
(45) Date of Patent: Jun. 9, 2020

(54) METHOD FOR IMPROVING LARGE ARRAY WIND PARK POWER PERFORMANCE THROUGH ACTIVE WAKE MANIPULATION REDUCING SHADOW EFFECTS

(71) Applicant: VESTAS WIND SYSTEMS A/S, Aarhus N (DK)

(72) Inventor: Carsten Hein Westergaard, Houston, TX (US)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 272 days.

(21) Appl. No.: 15/726,689

(22) Filed: Oct. 6, 2017

(65) Prior Publication Data

US 2018/0045182 A1 Feb. 15, 2018

Related U.S. Application Data

(63) Continuation of application No. 14/344,284, filed as application No. PCT/DK2012/050301 on Aug. 21, 2012, now Pat. No. 9,835,138.

(60) Provisional application No. 61/534,064, filed on Sep. 13, 2011.

(30) Foreign Application Priority Data

Sep. 13, 2011 (DK) .................................. 201170503

(51) Int. Cl.
*F03D 7/04* (2006.01)
*F03D 7/02* (2006.01)

(52) U.S. Cl.
CPC .......... *F03D 7/048* (2013.01); *F03D 7/0204* (2013.01); *F03D 7/028* (2013.01); *F03D 7/0224* (2013.01); *F03D 7/0276* (2013.01); *F05B 2270/111* (2013.01); *F05B 2270/328* (2013.01); *F05B 2270/329* (2013.01); *F05B 2270/335* (2013.01); *Y02E 10/723* (2013.01)

(58) Field of Classification Search
CPC .......................... F03D 7/048; F05B 2270/111
See application file for complete search history.

(56) References Cited

U.S. PATENT DOCUMENTS

| | | | |
|---|---|---|---|
| 4,084,921 A | 4/1978 | Norz | |
| 7,299,627 B2 | 11/2007 | Corten et al. | |
| 7,569,945 B2 | 8/2009 | Pedersen | |
| 8,287,228 B2 * | 10/2012 | Kinzie | F03D 7/0296 415/1 |
| 2006/0131889 A1 | 6/2006 | Corten et al. | |

(Continued)

*Primary Examiner* — Igor Kershteyn
*Assistant Examiner* — Brian O Peters
(74) *Attorney, Agent, or Firm* — Patterson + Sheridan, LLP

(57) ABSTRACT

Embodiments of the present invention provide methods and apparatus for increasing turbulent mixing in the wake of at least one wind turbine. Doing so, increases efficiency of a wind turbine located in the wake by transferring energy to the wake that was lost when the wind passed through the upwind turbine. Turbulent mixing may be increased by changing the induction factor for a rotor by, for example, altering the pitch of the blades, the RPMs of the rotor, or the yaw of the nacelle. These techniques may be static or dynamically changing. Further, the different induction factors for a plurality of wind turbines may be synchronized according to a predetermined pattern to further increase turbulent mixing.

20 Claims, 10 Drawing Sheets

(56) References Cited

U.S. PATENT DOCUMENTS

2006/0232073 A1 10/2006 Corten et al.
2009/0099702 A1 4/2009 Vyas et al.
2015/0050144 A1 2/2015 Westergaard

* cited by examiner

METHOD FOR IMPROVING LARGE ARRAY WIND PARK POWER PERFORMANCE THROUGH ACTIVE WAKE MANIPULATION REDUCING SHADOW EFFECTS

CROSS-REFERENCE TO RELATED APPLICATIONS

This application is a continuation of co-pending U.S. patent application Ser. No. 14/344,284, filed Oct. 14, 2014, which is a '371 of International Application Number PCT/DK2012/050301, filed Aug. 21, 2012, which claims benefit of U.S. Provisional Application No. 61/534,064, filed Sep. 13, 2011 and claims priority to Danish Application PA 2011 70503, filed Sep. 13, 2011. Each of these applications is herein incorporated by reference in its entirety.

BACKGROUND

Field of the Invention

Embodiments of the invention generally relate to wind turbines and, more particularly, to manipulating the induction factor for a rotor to increase the turbulent mixing process in the wake of a wind turbine.

Description of the Related Art

Wind turbine arrays (i.e., multiple wind turbines arranged into wind parks) are becoming an increasing popular technique for generating electricity from wind energy. Using a plurality of wind turbines in a relatively small geographic region allows wind energy to take advantage of economies of scale. That is, a wind turbine array may offer cheaper construction costs, shared infrastructure, and lower maintenance costs than if the same number of wind turbines were built individually.

However, the layout of the wind turbines in an array affects the efficiency and the annual energy production (AEP) of the array. Specifically, the wake of one turbine may limit the efficiency of a downwind turbine. In some instances, the effectiveness of a downwind turbine is reduced by 65%. In total, the efficiency for a wind array may be 75% of its nominal performance (i.e., if none of the wind turbines were affected by the wake of other upwind turbines). Spreading out the wind turbines increases the efficiency of the array, but this may reduce the advantages of the economy of scale. Furthermore, in many cases the amount of land that can be used is restricted. Thus, the better solution is determining a way to increase efficiency of wind turbines in an array without increasing the area of the wind park.

SUMMARY

Embodiments of the invention generally relate to wind turbines and, more particularly, to manipulating the induction factor for a rotor to increase the turbulent mixing process in the wake of a wind turbine.

One embodiment of the present invention is a wind turbine array comprising a first and second wind turbine where the second wind turbine is positioned downwind of the first wind turbine. A controller configured to change at least one operational parameter of at least one blade on both the first and second wind turbines where the operational parameter is set by predetermined settings and changes an induction factor of the at least one blade on both the first and second wind turbines. Moreover, the predetermined settings are assigned based on a first location of the first wind turbine in the wind turbine array relative to a second, different location of the second wind turbine in the wind turbine array.

Another embodiment of the present invention is a method of optimizing a wind turbine array that provides a first and second wind turbine within the wind turbine array where a rotor of the second wind turbine receives fluid that has previously been affected by a rotor of the first wind turbine. The method assigns predetermined settings to both the first and second wind turbines that change at least one operational parameter of at least one blade on both the first and second wind turbines, wherein the predetermined settings are assigned based on a first location of the first wind turbine in the wind turbine array relative to a second, different location of the second wind turbine in the wind turbine array. Moreover, the at least one operational parameter changes an induction factor of the at least one blade on both the first and second wind turbines.

Another embodiment of the present invention is a method of operating a wind turbine comprising manipulating a pitch of a blade of the wind turbine according to a blade pitch profile that causes the blade to be at a first pitch angle at a first location of the blade in a rotor blade plane and at a second pitch angle at a second location of the blade in the rotor blade plane. The first and second positions being in fixed positions relative to each other and the first pitch angle is less than the second pitch angle. The first location is substantially at either a twelve o'clock position or a six o'clock position in the rotor blade plane and the blade is at the twelve o'clock position when a tip of the blade is at a highest point relative to a ground plane. The second location is substantially at either a three o'clock position or a nine o'clock position.

Another embodiment of the present invention is a wind turbine array comprising a plurality of wind turbines each capable of yawing and, for in a given yaw configuration, comprising two columns of wind turbines three rows deep. The wind turbine array includes a control system configured to synchronously change at least one operational parameter of at least one blade on all of the plurality of wind turbines where the operational parameter is set by predetermined settings and causes respective blade rotation behavior of the plurality of wind turbines to be synchronized and out of phase with each other in a manner predetermined to induce a relative increase of turbulent mixing in respective wakes as a result of cooperative wake generation between the two columns of wind turbines.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

A wind turbine uses a rotor consisting of multiple blades to convert kinetic energy of the wind into electrical energy. Specifically, the velocity of the wind causes the blades to rotate which in turn power an electric generator. The rotating blades, however, slow down the wind and cause a wake (or shadow) to form behind the turbine. The wind within the wake has a slower velocity than the wind that did not pass through the turbine's blades. Moreover, the slower velocity of the wind in the wake relative to the velocity of the wind unaffected by the rotor causes the diameter of the wake to expand beyond the diameter of the rotor (i.e. wake expansion). Generally, the wake defines a volume of fluid (e.g., air) that is affected by the blades of a turbine. Any downwind turbine that lies within this wake can only use the relatively slower wind velocity to turn its blades.

The wind velocity may be increased and the diameter of the wake decreased by transferring kinetic energy from the wind surrounding the wake into the wake itself. This process is called turbulent mixing. The mixing rate may be described by the shear rate, which is the velocity difference between the air flowing in the inner part of the wake and the air flowing in the outer free layer. Because turbulent mixing happens naturally, the kinetic energy taken from the wind by a turbine will eventually be replaced. However, the distance required to transfer the kinetic energy into the wake depends on the wind speed. Thus, the distance between a first and second turbine positioned close together (e.g., within 10 rotor diameters) may not be enough to return the kinetic energy taken by the first turbine before the wind reaches the second turbine (assuming the second turbine is in the first turbine's wake). However, turbulent mixing may be increased by changing the induction factor—the variable that controls wake expansion and describes the state of the wake. The induction factor may be altered by, for example, cyclic pitching, permanent pitching, alternating the tip-speed, or varying the yaw of a turbine. These techniques minimize the detrimental effect from having one turbine located in the wake of another turbine and permit multiple wind turbines to be arranged in close proximity.

An Example Wind Turbine Generator

Figure 1:
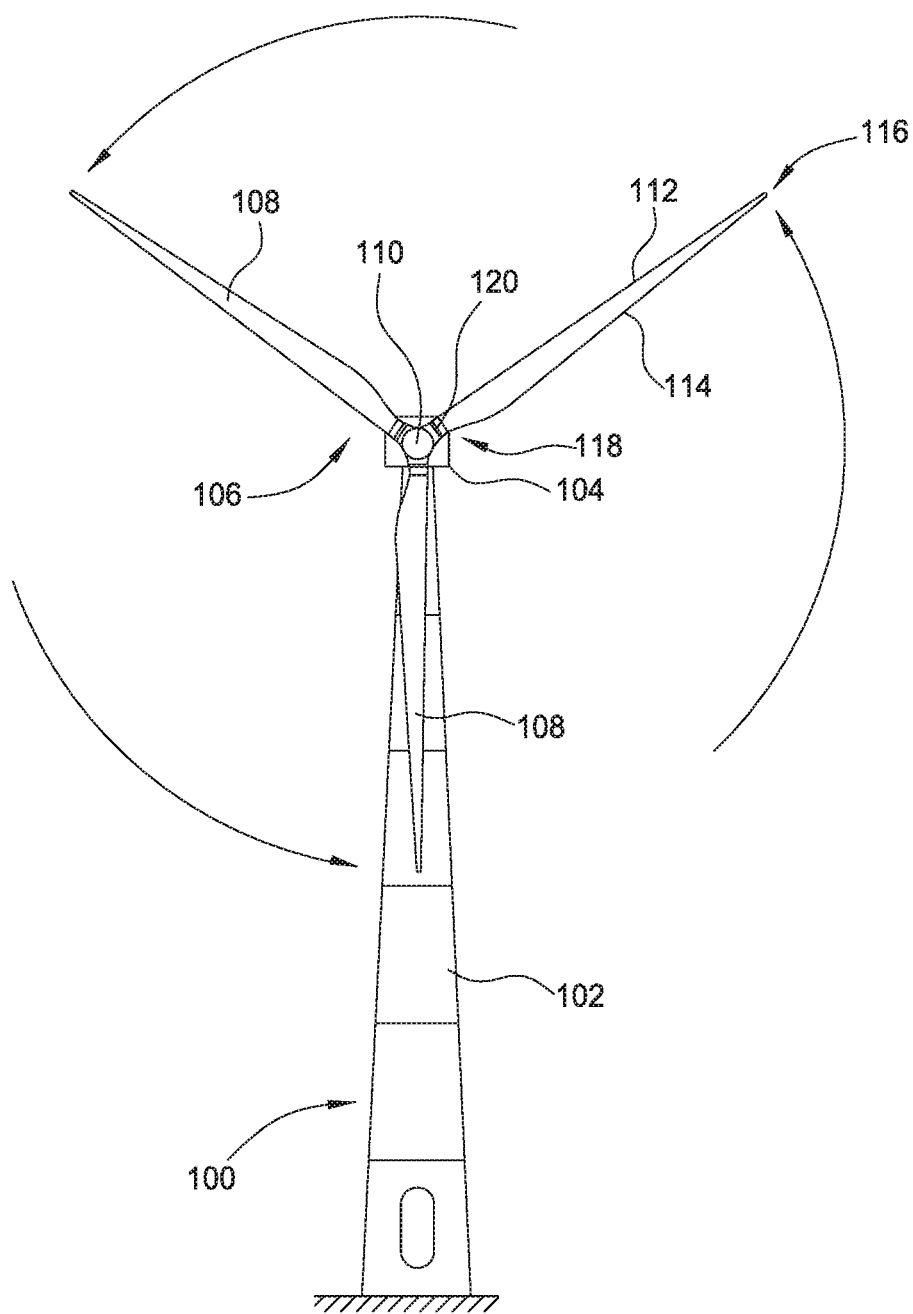
FIG. 1 illustrates a diagrammatic view of a wind turbine generator, according to an embodiment of the invention.

FIG. 1 illustrates a diagrammatic view of a horizontal-axis wind turbine generator 100. The wind turbine generator 100 typically comprises a tower 102 and a wind turbine nacelle 104 located at the top of the tower 102. A wind turbine rotor 106 may be connected with the nacelle 104 through a low speed shaft extending out of the nacelle 104. The wind turbine rotor 106 comprises three rotor blades 108 mounted on a common hub 110, but may comprise any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 may be controlled by linear actuators or stepper motors, for example, connected between the hub 110 and the blade 108.

Figure 2:
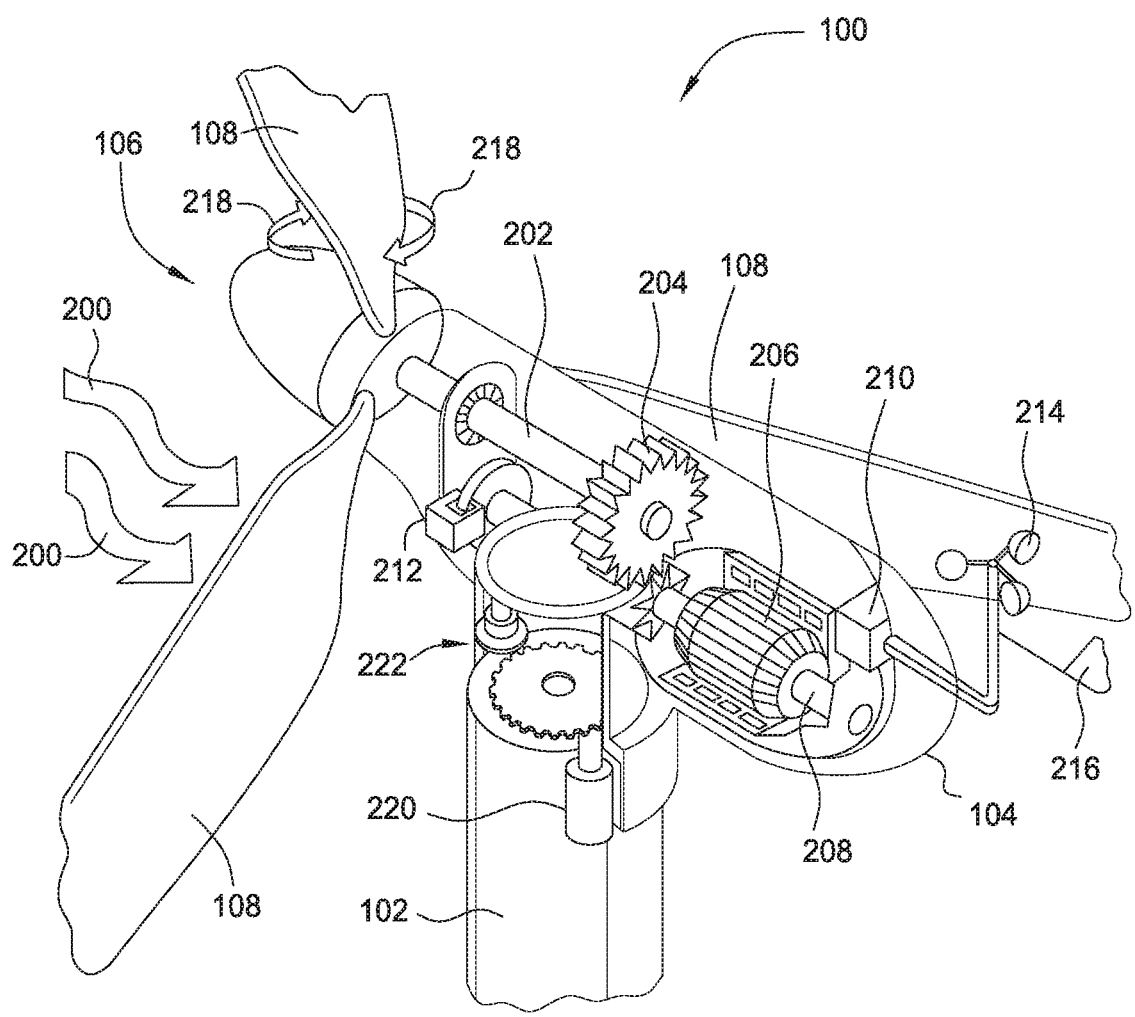
FIG. 2 illustrates a diagrammatic view of the components internal to the nacelle and tower of a wind turbine generator, according to an embodiment of the invention.

FIG. 2 illustrates a diagrammatic view of typical components internal to the nacelle 104 and tower 102 of a wind turbine generator 100. When the wind 200 pushes on the blades 108, the rotor 106 spins and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206.

A controller 210 may sense the rotational speed of one or both of the shafts 202, 208. If the controller decides that the shaft(s) are rotating too fast, the controller may signal a braking system 212 to slow the rotation of the shafts, which slows the rotation of the rotor 106—i.e., reduces the revolutions per minute (RPM). The braking system 212 may prevent damage to the components of the wind turbine generator 100. The controller 210 may also receive inputs from an anemometer 214 (providing wind speed) and/or a wind vane 216 (providing wind direction). Based on information received, the controller 210 may send a control signal to one or more of the blades 108 in an effort to adjust the pitch 218 of the blades. By adjusting the pitch 218 of the blades with respect to the wind direction 200, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Figure 3:
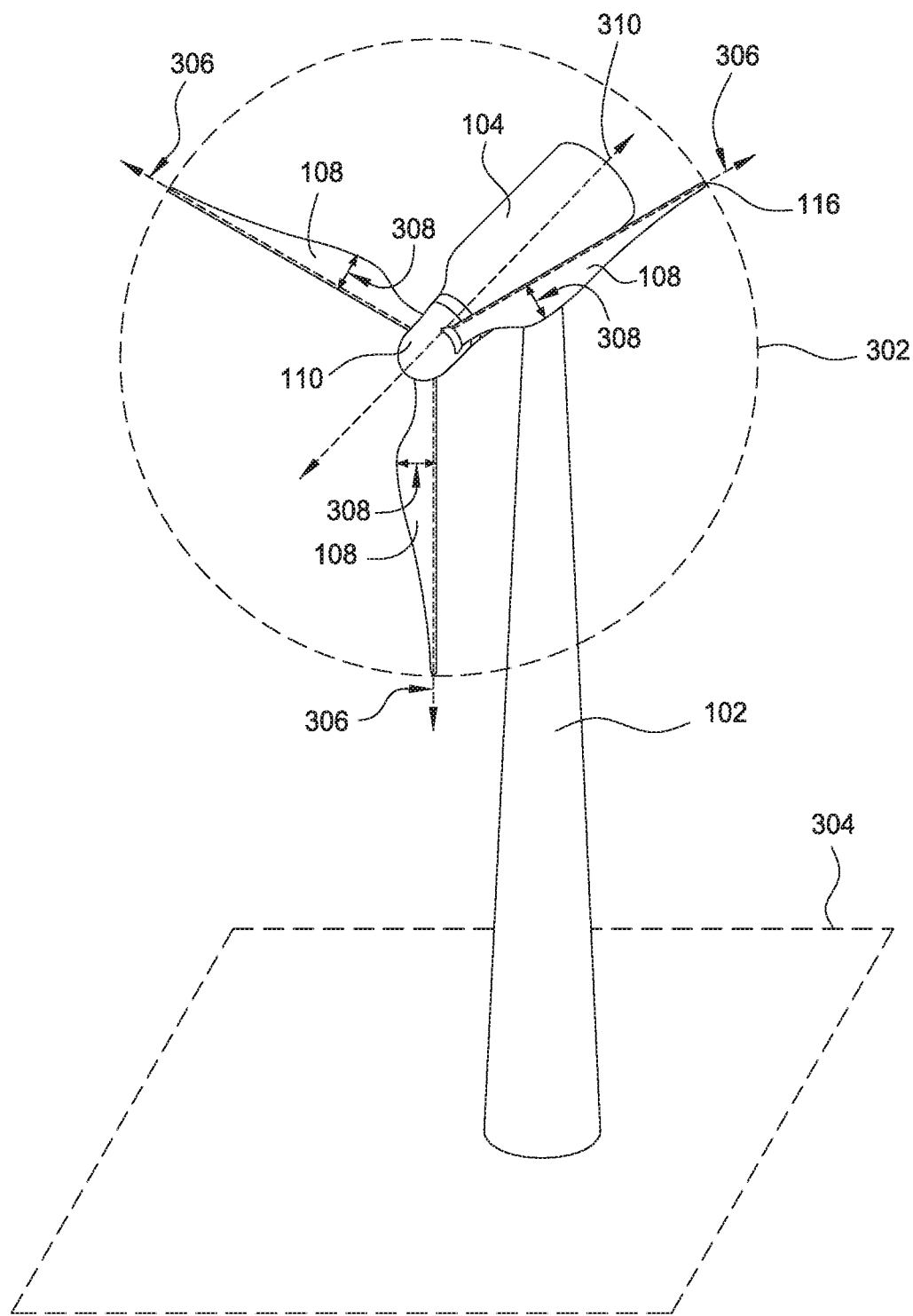
FIG. 3 illustrates a diagrammatic view of different axes and surfaces of a wind turbine, according to an embodiment of the invention.

FIG. 3 illustrates a diagrammatic view of different axes and surfaces relevant to a wind turbine. Ground plane 304 defines a plane that is substantially normal to the longitudinal axis of the tower 102. The nacelle longitudinal axis 310 defines an axis running through the hub 110 to the opposite end of the nacelle 104. This axis 310 is generally parallel to the ground plane 304 and is the axis about which the blades rotate. The area traversed by the blades as they rotate around the nacelle longitudinal axis 310 is referred to as a rotor plane 302. The orientation of the rotor plane 302 may be changed by the yaw motor 220 and the yaw drive 222 (both shown in FIG. 2). The blades' longitudinal axes 306 each define an axis that runs from the hub 110 to the tip 116 of the blade 108. Further, the blades' transverse axes 308 (or chord) each define an axis that is directly related to the pitch angle of the blade 108. As the blade 108 pitches into the wind—i.e., the leading edge 112 rotates opposite the direction of the wind flow—a corresponding blade's transverse axis 308 becomes more normal to the rotor plane 302 and the pitch angle increases.

The Effects of a Wake in a Wind Turbine Array

Figure 4A:
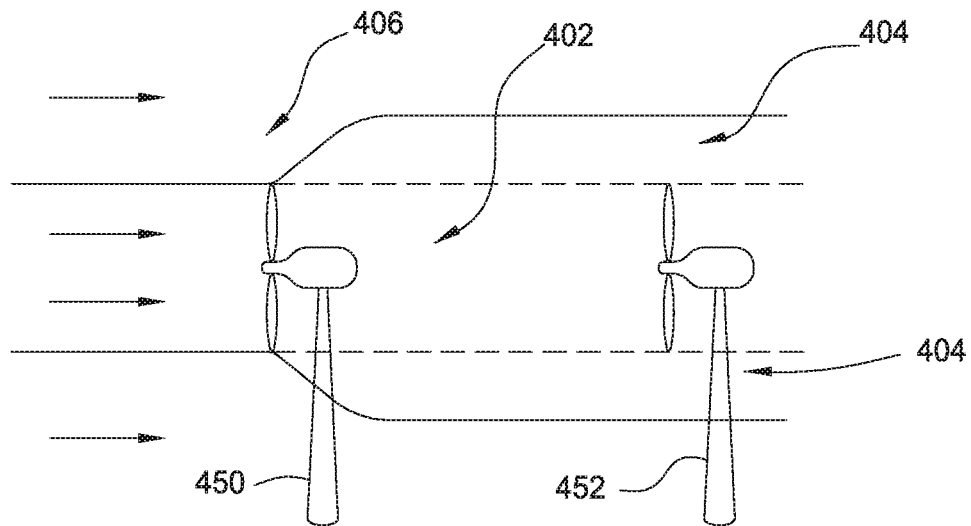
FIG. 4A-4B illustrate the wake effects of an upwind turbine on a downwind turbine, according to an embodiment of the invention.
Figure 4B:
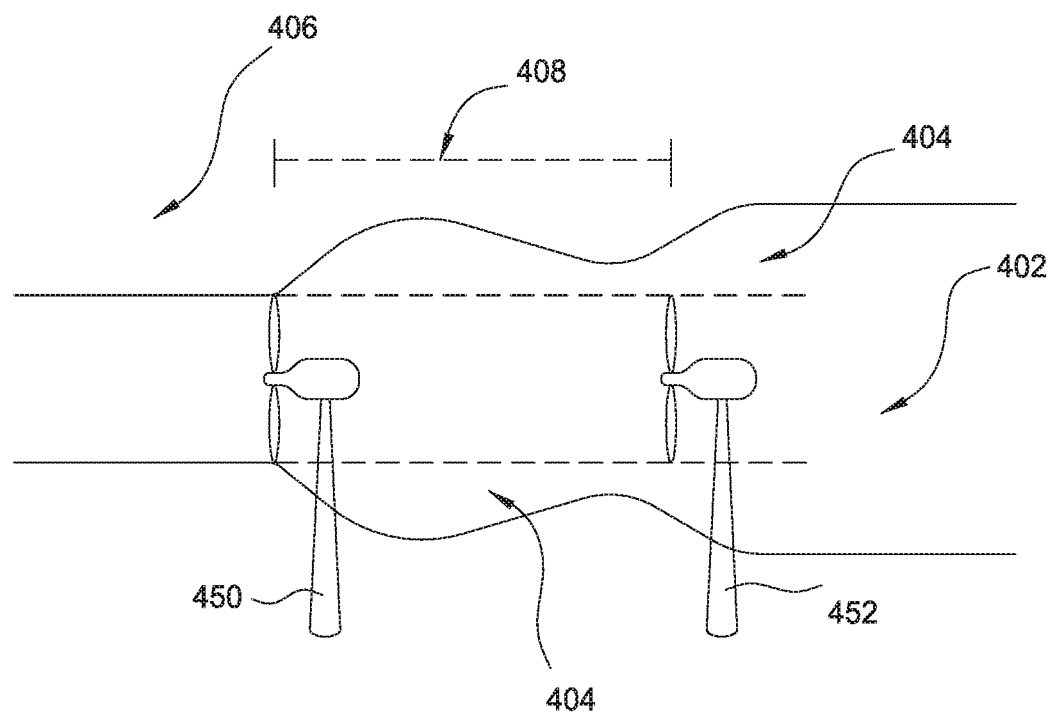

FIGS. 4A-4B illustrate the wake effects of an upwind turbine on a downwind turbine. Note that all the following figures illustrating wake flows are not intended to be drawn to scale. In FIG. 4A, turbine 452 is downwind from turbine 450, with the wind direction corresponding to the arrows that are in front of Turbine A. The wind exerts a force on the blades of turbine 450 such that they begin to rotate, thereby transferring energy from the wind to the turbine 450. This energy transfer also robs the wind of velocity and causes the wake 402 (or shadow) downwind of Turbine A to expand. The wake 402 defines a volume of air that is affected by the rotors of the turbines 450, 452. If no energy were transferred from the wind to the turbines 450, 452 (i.e., the turbines 450, 452 did not change the velocity or direction of the wind) the wake 402 would have substantially the same diameter as the rotors 106.

A turbine (e.g., turbine 452) located in the wake 402 of an upwind turbine generally has lower efficiency than the upwind turbine. This occurs because the portion of the wake 402 between the two turbines 450, 452 has a lower wind velocity than the wind entering turbine 450; thus, the turbine 452 is typically unable to produce power with the same efficiency as turbine 450.

A shear layer 404 is a volume of fluid found within the wake 402. Specifically, the shear layer 404 is an annular volume with an inner surface that equals the diameter of the rotor of a turbine and an outer surface that defines the outer boundary of the wake 402. Thus, the expansion and contraction (or relaxation) of the cross-sectional area of the shear layer 404 defines the expansion and contraction of the wake 402. The free layer 406 is a volume of fluid outside of the wake that is unaffected by the rotors of turbines 450 and 452.

FIG. 4B illustrates a wake 402 undergoing wake relaxation through a turbulent mixing process. Similar to FIG. 4A, the wake 402 of FIG. 4B expands downwind of the turbines 450, 452 as shown by the shear layer 404. The expansion of the wake can be described by an induction factor. Generally, the induction factor is the ratio between the velocity of the wind entering a rotor plane 302 and the velocity of the wind exiting the rotor plane 302. Stated simply, the wake 402 expands as the induction factor increases, and vice versa. Accordingly, wake expansion is directly proportional to the induction factor. Moreover, each blade may have an individual induction factor associated with it. The induction factor for a blade may be reduced by pitching the blade into the wind (i.e., rotating the blade's transverse axis 308 such that it is more normal to the rotor plane 302), decreasing the angular velocity—e.g., RPM—of the tip 116 of the blades, changing the yaw of the turbine, and the like. Thus, a controller may change the induction factor for a single blade according to the blade's position in the rotor plane 302 (e.g., changing the pitch of only one blade) or for all the blades simultaneously (e.g., pitching each of blades or changing the tip-speed of the blades).

FIG. 4B also illustrates a relaxation length 408—i.e., the distance necessary to return a certain percentage of the energy lost after the wind intersects a rotor. For example, the relaxation length 408 may be defined as the distance required for transferring 50% of the energy that was taken by the turbine 450 into the wake 402. Further, the relaxation length 408 may decrease and increase based on the velocity of the wind. Typically, higher wind velocities require less distance, and thus a shorter relaxation length 408, to transfer the energy that was taken by the turbine 450 into the wake 402. However, the relaxation length 408 may also depend on the distinct state of the wake 403 as described by the induction factor. The returned energy is transferred from the free layer 406 to the wake 402 by turbulent mixing. Although not illustrated, the turbulent mixing process occurs between the shear layer 404 and the free layer 406. As more energy is transferred into the wake 402 via the free layer 406, the volume of the shear layer 404 begins to decrease and the wind velocity in the wake 402 begins to increase. Eventually, given enough distance, all the energy lost to the turbines 450,452 is transferred into the wake 402 such that it is the same diameter as the rotors of turbines 450, 452, and the wind velocity within the wake 402 is equal to the wind velocity in the free layer 406.

Embodiments of the present invention disclose techniques for shortening a relaxation length 408 by increasing turbulent mixing. Stated differently, the techniques may shorten the relaxation length for any fixed velocity of wind entering a rotor 106. In general, the relaxation length is the distance needed to transfer a certain percentage of the energy taken by the upwind rotor into the wake 402. Decreasing the relaxation length 408 permits the wind turbines 450, 452 to be spaced closer together without sacrificing efficiency. For example, after shortening the relaxation length 408 from a longer, original relaxation length, a downwind turbine that is at a distance equal to the shortened relaxation length 408 from an upwind turbine is just as efficient as a downwind turbine that is at a distance equal to the original relaxation length from the upwind turbine that does not use the shortening techniques described herein. Alternatively, even if the wind turbine remained at a distance equal to the original relaxation length from the upwind turbine, shortening the relaxation length 408 would further increase the velocity of the wind in the wake 402 and thus improve the efficiency of the turbine. Increasing the efficiency of turbine 452 may then increase the combined AEP of the two turbines 450, 452.

Increasing the Turbulent Mixing Process

Figure 5A:
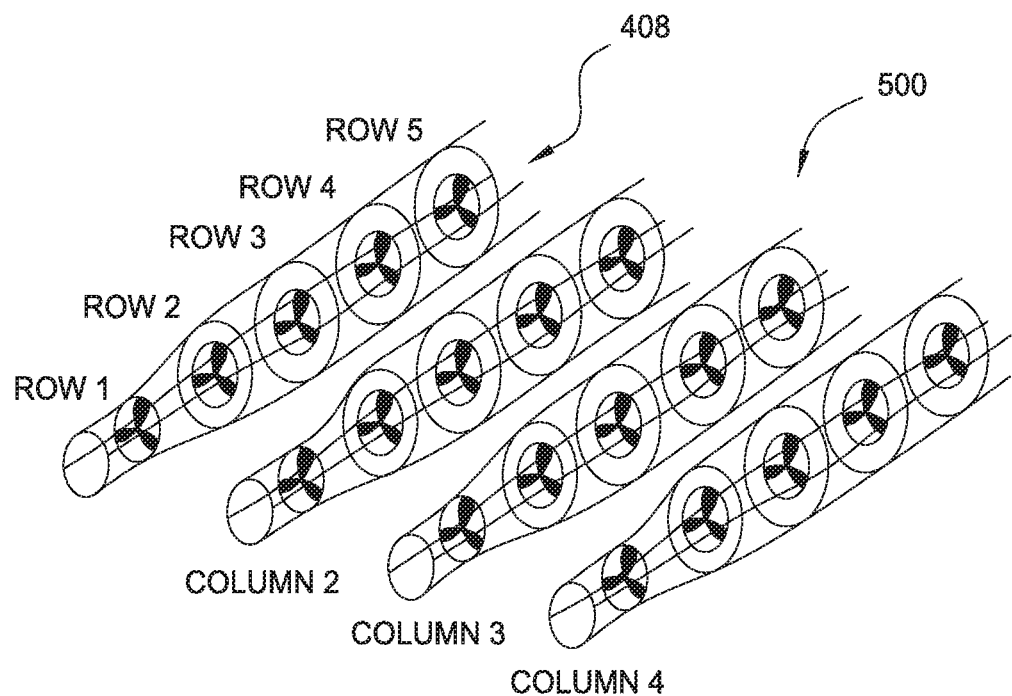
FIG. 5A-5B illustrate a wind arrays experiencing wake expansion, according to embodiments of the invention.
Figure 5B:
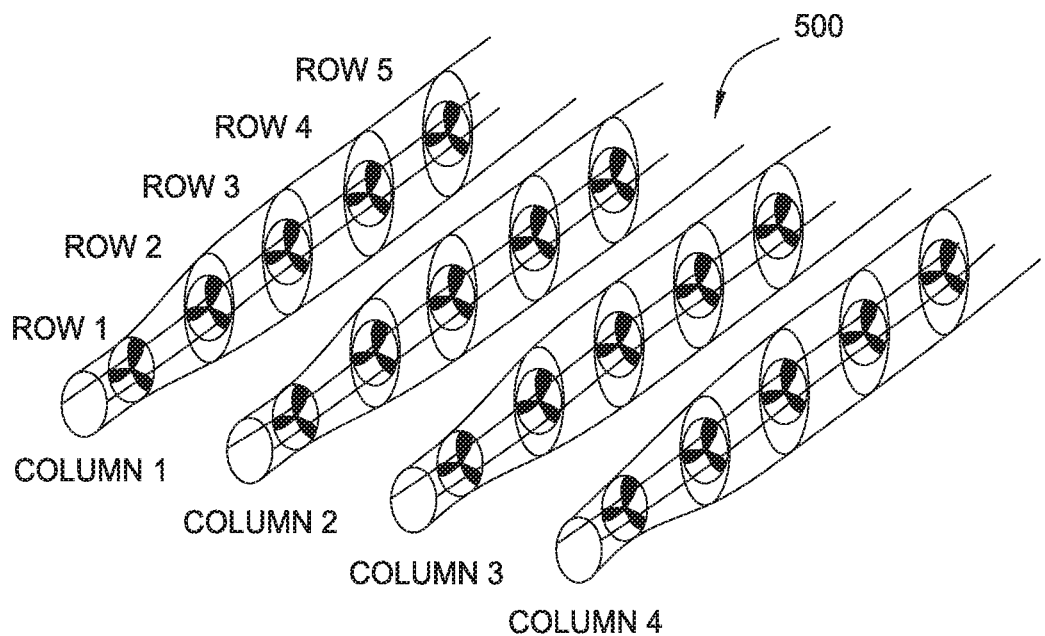

FIGS. 5A-5B illustrate a wind array 500 experiencing wake expansion. For clarity, only the rotor blades for each turbine are shown. The wind array 500 is arranged into four columns and five rows, however, the disclosed embodiments may be used on an array with any number of rows, columns, or diagonals. The inner circle for each blade represents the rotor plane of the turbine while the outer circle represents the outer layer of the wake 402. Moreover, for FIGS. 5A-B, 6A-B, 7A, 8A-B and 9B, assume that the direction of the wind entering the array is parallel to the direction of the columns. However, because turbines are typically capable of yawing, the techniques discussed herein may be used with wind entering the arrays at any direction (e.g., along a row or diagonal) or from two or more directions simultaneously (e.g., the wind array may be subdivided based on the number of directions that wind enters the array).

FIG. 5A illustrates an array 500 experiencing wake expansions without using techniques for increasing turbulent mixing to reduce the relaxation length. As shown, after the wind reaches the first row, the wake expansion increases such that the wake 402 has a diameter larger than the diameter of the rotors. Because of the close proximity between the turbines in the arrays, turbulent mixing does not transfer a significant amount of energy back into the wake 402 before the wake 402 reaches another turbine in the column.

FIGS. 5B, 6A-B, 7A, 8A-B and 9B illustrate different methods of changing operational parameters of the turbine such that an induction factor associated with one or more blades is changed, thereby increasing turbulent mixing. However, for the sake of simplicity, the figures do not show the wake relaxation or constriction that may occur in the shear layer 404 from the increased turbulent mixing. It is assumed that the wake relaxation shown in FIG. 4B may occur in the wakes shown in FIGS. 5B, 6A-B, 7A, 8A-B and 9B.

FIG. 5B illustrates a wind array 500 that uses cyclic pitching to increase turbulent mixing. Cyclic pitching allows the turbines to increase the pitch (i.e., pitch into the wind) of a blade at certain angles relative to the ground plane but not at others (i.e., at certain positions in the rotor plane). Cyclic pitching may be controlled by the pitch bearings 120, linear actuators, or stepper motors (i.e., controllers) described in FIG. 1. As shown by FIG. 5B, an instance of a blade pitch profile for a rotor of a turbine may be when one or more blades are at a maximum pitch when they are substantially parallel to the ground plane 304 and at a minimum pitch when they are substantially normal to the ground plane 304. Stated differently, when a blade's longitudinal axis 306 is parallel to the ground plane 304, the blade's transverse axis 308 is more normal to the rotor plane 302 than when the blade's longitudinal axis 306 is normal to the ground plane 304. In one embodiment, the locations in the rotor plane 302 where the blade has a maximum pitch and a minimum pitch, respectively, are fixed positions relative to each other.

In one embodiment, the blade has a zero (or close to zero) pitch (i.e., the minimum pitch) relative to the rotor plane 302 when the blade's longitudinal axis 306 is normal to the ground plane 304 and, for example, a positive 10 degree pitch (i.e., a maximum pitch relative to the minimum pitch) when the blade's longitudinal axis 306 is parallel to the ground plane 304. In another embodiment, the maximum pitch may be between 10-20 degrees relative to the rotor plane 302. In another embodiment, the maximum pitch may be between 5-10 degrees relative to the rotor plane 302. In another embodiment, the maximum pitch may be between 5-20 degrees relative to the rotor plane 302.

As the blade travels from an orientation that is normal to the ground plane 304, the pitch may simultaneously increase linearly, exponentially, or in a stepwise manner such that the pitch is at a maximum when the blade is substantially parallel with the ground plane. As the blade travels from an orientation that is parallel to the ground to an orientation that is normal to the ground, the pitch decreases linearly, exponentially, or in a stepwise manner to the minimum pitch.

When the blade is at a minimum pitch (e.g., zero pitch) the induction factor (contributed by that blade), and thereby the wake expansion, are at maximums. When the blade is at a maximum pitch, the reverse is true. Accordingly, cyclic pitching results in the vertical ellipses shown in FIG. 5B where wake expansion is at a maximum when the pitch is at a minimum and the wake expansion is a minimum when the pitch is at a maximum. Although FIG. 5B illustrates cyclic pitching where the wake expansion is a maximum on an axis that is normal to the ground plane, cyclic pitching that creates a maximum and minimum wake expansion at any angle of the rotor plane 302 is also contemplated.

Generating the vertical ellipses increases turbulent mixing. For example, the narrow minor axis of the ellipse permits a larger free layer between the wakes 402 of each column when compared to the cross-sectional area of the free layer between the columns shown in FIG. 5A. Thus, the elliptical shape allows a larger area between the columns of higher velocity air which increases the shear rate over the mixing layer and promotes increased turbulent mixing between the sides of the wake 402 that are closest to neighboring columns. Moreover, as the free layer moves deeper into the array, more and more energy is transferred from the free layer into the wake 402. For turbines located in deeper rows of the array 500 (e.g., row 4 and greater) the free layer between the columns is more likely able to transfer energy to the wake if the free layer was wider at the front of the column—i.e., it is more likely that the free layer has not transferred all its energy to earlier rows. In general, the greater the cross-sectional area of the free layer between the columns of the array 500, the greater the likelihood that turbulent mixing may transfer energy to the deeper rows in the array.

Figure 6A:
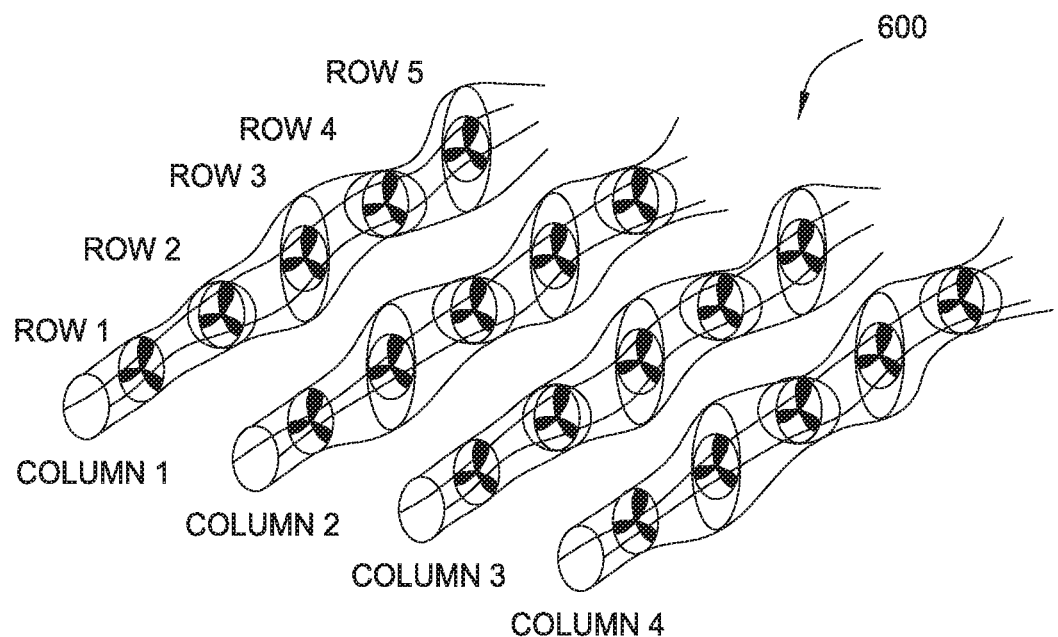
FIG. 6A-6B illustrate synchronized wind arrays that vary the orientation of the cyclic pitching, according to embodiments of the invention.
Figure 6B:
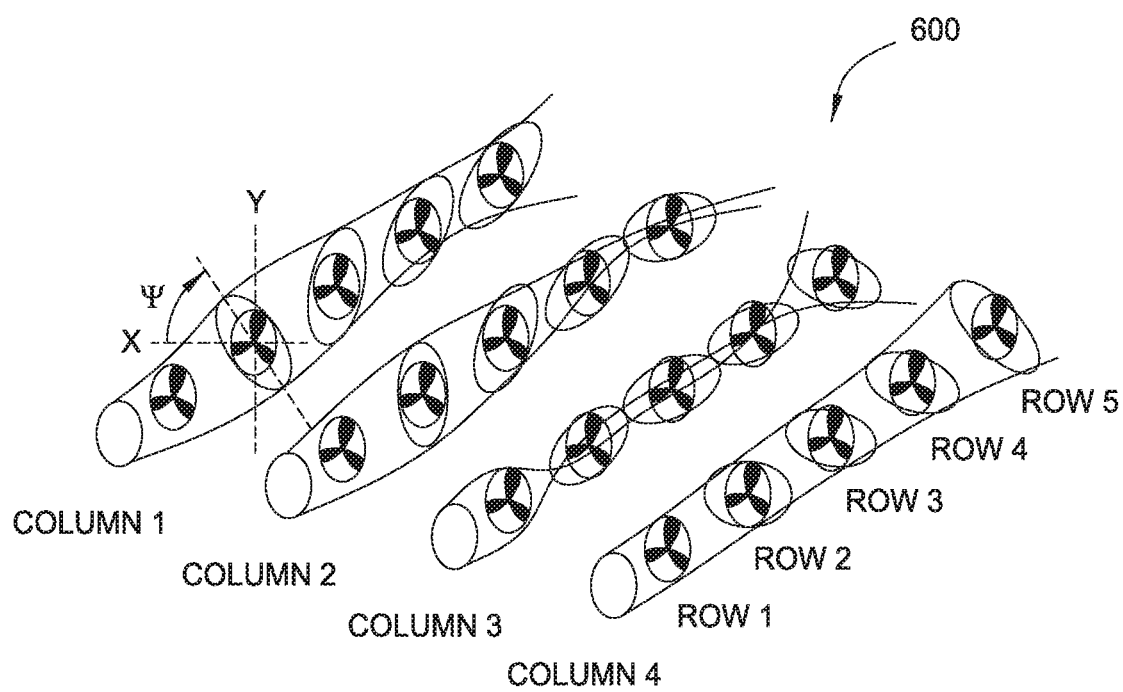

FIGS. 6A-6B illustrate synchronized wind arrays 600 that vary the orientation of the cyclic pitching depending on the location of the turbine within the array 600. As shown in FIGS. 6A-6B, a synchronized wind array assigns operating parameters (i.e., blade pitch, tip-speed, and yaw) to a wind turbine based on the wind turbine's location relative to neighboring turbines. In this manner, the wind array may be synchronized to form a pattern. In FIG. 6A, each turbine performs cyclic pitching but may have a different maximum or minimum pitch orientation (i.e., different instances of a blade pitch profile) than a neighboring turbine in the same row or column. For example, the turbine at column 2, row 3 has a maximum pitch when the blade's longitudinal axis 306 is normal to the ground plane 304 and a minimum pitch when the axis 306 is parallel to the ground plane 304. However, the turbines at column 2 row 2 and at column 1 row 3 have a maximum pitch when their respective axes 306 are parallel to the ground plane 304 and a minimum pitch when their axes 306 are normal to the ground plane 304. Generally, a turbine may have an orientation for a maximum or minimum pitch that is different from a neighboring turbine by a predefined phase. In FIG. 6A, this predefined phase is 90 degrees. Moreover, the pattern may continue such that every other turbine in the same column or row share the same orientation for cyclic pitching. That is, each turbine in the array 600 is assigned a predetermined setting specific to its location within the array 600 and relative to neighboring turbines, such as by the row and column the turbine is located on.

In one embodiment, to increase the likelihood that deeper rows will benefit from the free layer between the columns, the pattern of alternating the orientation of cyclic pitching may not begin until deeper rows (i.e., the rows farthest from where the wind enters the column) in the array 600. For example, array 500 of FIG. 5B may be combined with array 600 such that the first five rows in each column use cyclic pitching without alternating the orientations for the maximum and minimum pitch (i.e., a vertical elliptical wake 402) while the last five rows in each column use the alternating orientations for cyclic pitching. Alternatively, the array 500 of FIG. 5A may also be combined with array 600 such that only the deeper rows in the array use cyclic pitching to increase turbulent mixing while the rows closest to where the wind enters a column (i.e., upwind of the deeper rows) do not.

FIG. 6B illustrates a wind array 600 where each turbine performs cyclic pitching but has a different maximum or minimum pitch orientation than a neighboring turbine in the same row or column. The turbine at column 1 row 2 has a maximum pitch when the blade is orientated 45 degree from the X axis as defined by the rotational angle ψ. Similar to FIG. 6A, each neighboring turbine may have a different rotational angle ψ associated with it. In one embodiment, the rotational angle ψ for each turbine in the array 600 is predefined—i.e., not determined by a feedback loop or from evaluating the performance of the turbines—and assigned based on the turbine's location within the array 600. In another embodiment, FIG. 6B may be combined with FIG. 5A or 5B such that only the deeper rows in the array have varying orientations for maximum and minimum pitch during cyclic pitching.

Figure 7A:
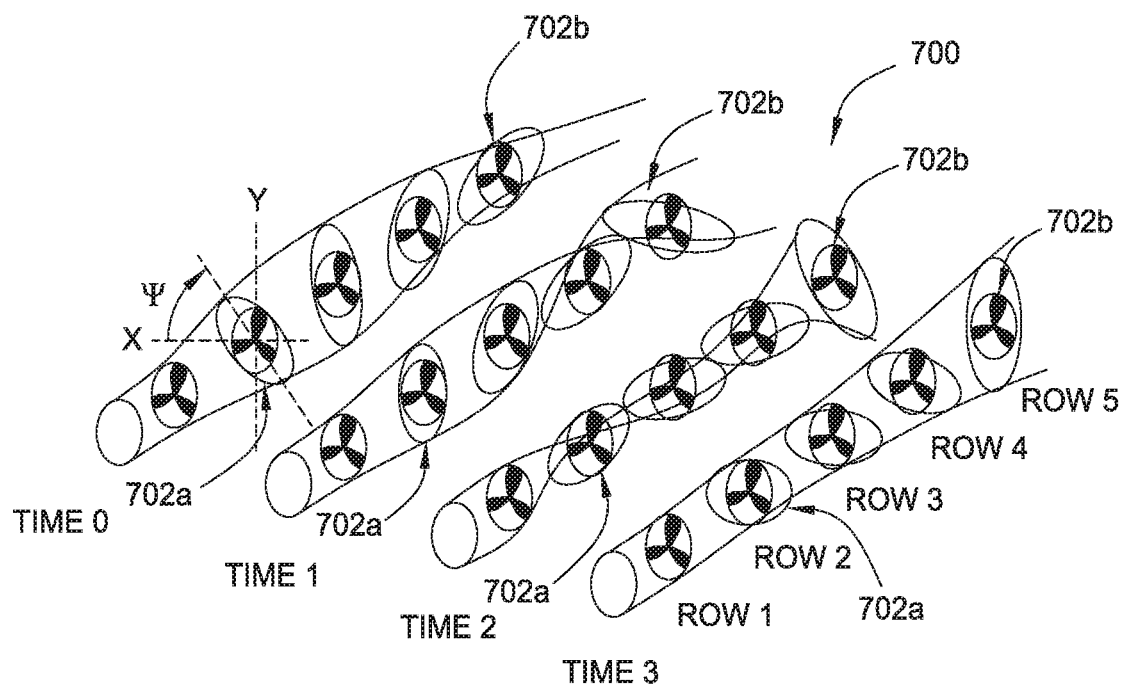
FIG. 7A-7B illustrate varying the orientations of one or more of the synchronized wind turbines according to time, according to embodiments of the invention.
Figure 7B:
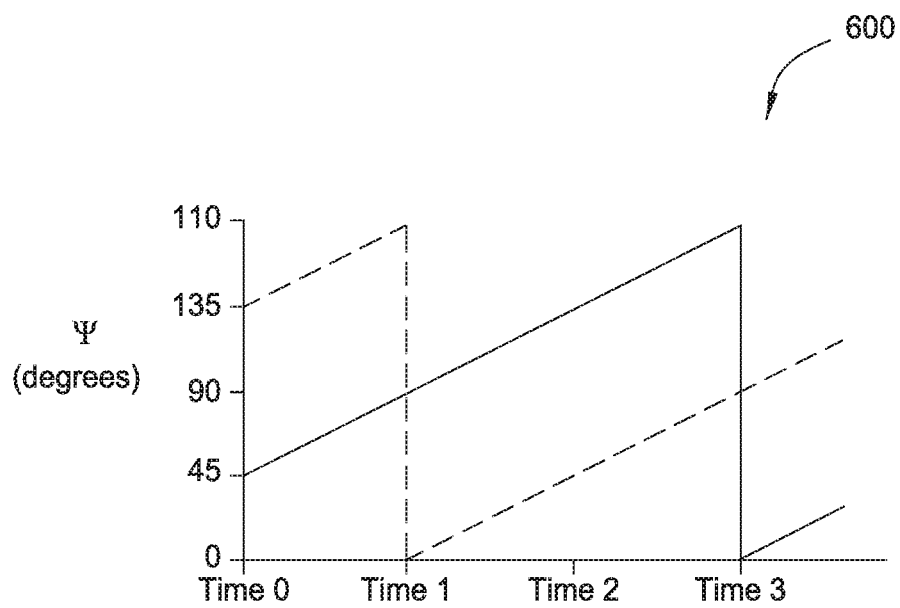

FIGS. 7A-7B illustrate varying the orientations of one or more of the wind turbines shown in FIG. 6B according to time. The array 700 illustrates the wake of a single column where the orientation of the minimum and maximum pitch varies based on time. That is, the blade pitch profile for a single turbine rotates dynamically. For example, the column may be column 1 shown in FIG. 6A. FIG. 7A illustrates four different "snapshots" of the column's wake at four different periods of time—time 0, time 1, time 2, and time 3. FIG. 7B is a graph plotting the changing rotational angle ψ for two of the turbines—turbine 702a and turbine 702b. Turbine 702a is represented by the solid line while turbine 702b is represented by the hashed line. The rotational angle ψ measures, in degrees, the distance from the X axis to the major axis of the oval or ellipse. Accordingly, the angle ψ ranges from 0 to 180 degrees. Although the changing cyclic pitching is shown to change linearly, it may change exponentially or at varying rates as the maximum or minimum pitching orientation rotates.

In one embodiment, the cyclic pitching does not continuously change. Instead, the turbines 702 may maintain their current orientation of the minimum and maximum pitch for a certain period of time (e.g., one minute or even one day) before transitioning into a different orientation. Thus, the graph shown in FIG. 7B may have periods where the angle L remains constant.

At time 0, turbine 702a has a rotational angle ψ of 45 degrees while turbine 702b has a rotational angle ψ of 135 degrees. Accordingly, the phase between the turbines 702 is 90 degrees. At time 1, the maximum pitch orientation for turbine 702b is parallel with the X axis and thus its rotational angle L is 180 degrees or zero which creates the discontinuity in the graph represented by the vertical line.

The dynamically changing column shown in FIG. 7A may be combined with FIG. 6B. That is, the orientation of the maximum and minimum pitch for at least one turbine dynamically changes in a predefined rotational rate of change. For example, the rate of change for the rotational angle ψ for each of the turbines may be the same as shown in Row 5 of FIG. 7A. However, the rate at which the orientation changes need not be the same for every turbine and may vary based on the turbine's location. For example, the angle ψ for the turbines in column 1 may change by 45 degrees during a predefined period while the angle ψ for turbines in column 2 may change by 90 degrees during that same period. For turbines where the rates at which the orientation changes are different, the turbines will also have varying phases between their orientations. The rate assigned to each turbine may be unique or based on an associated row, column, or diagonal.

Figure 8A:
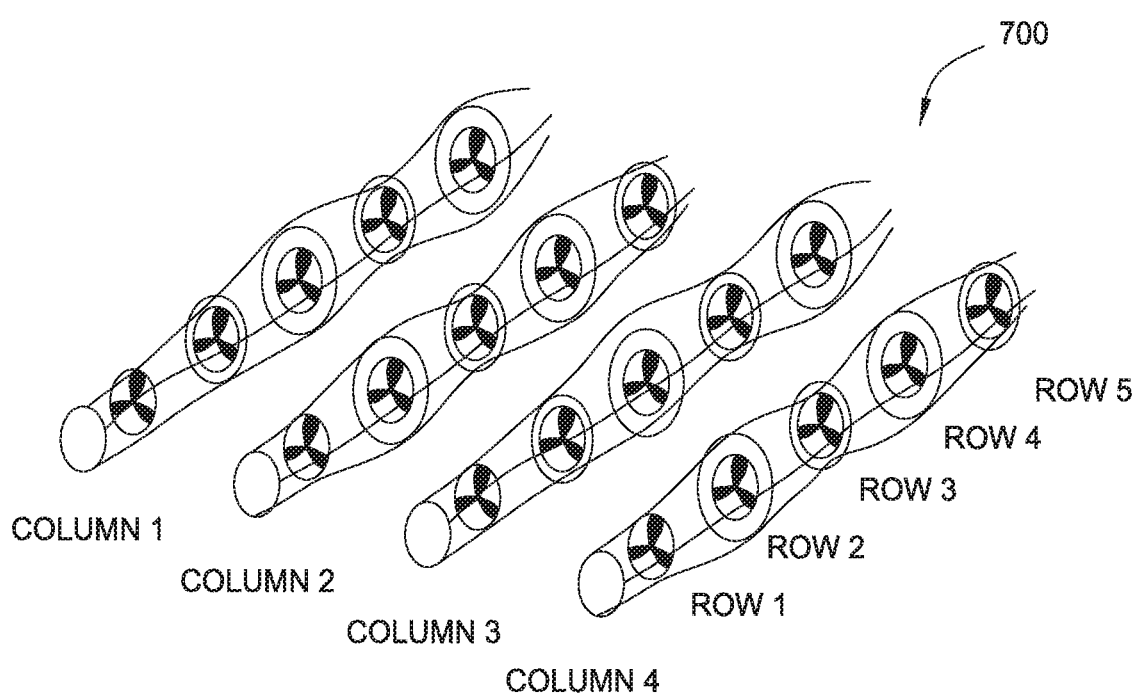
FIG. 8A-8C illustrate a technique of increases turbulent mixing in a synchronized wind array, according to embodiments of the invention.
Figure 8B:
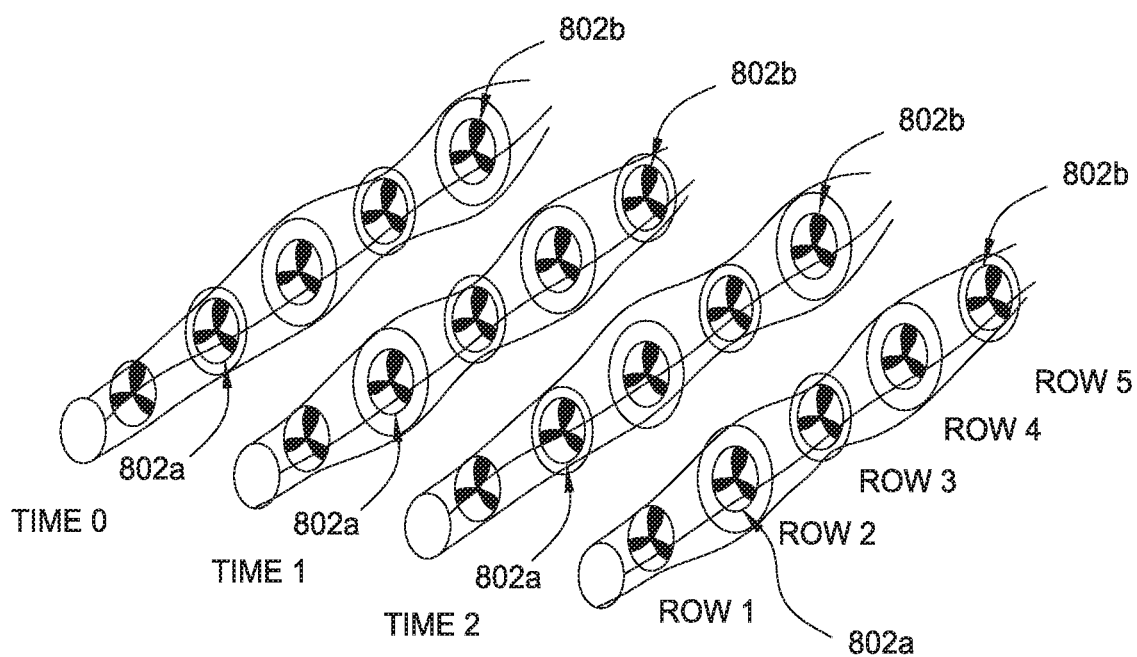
Figure 8C:
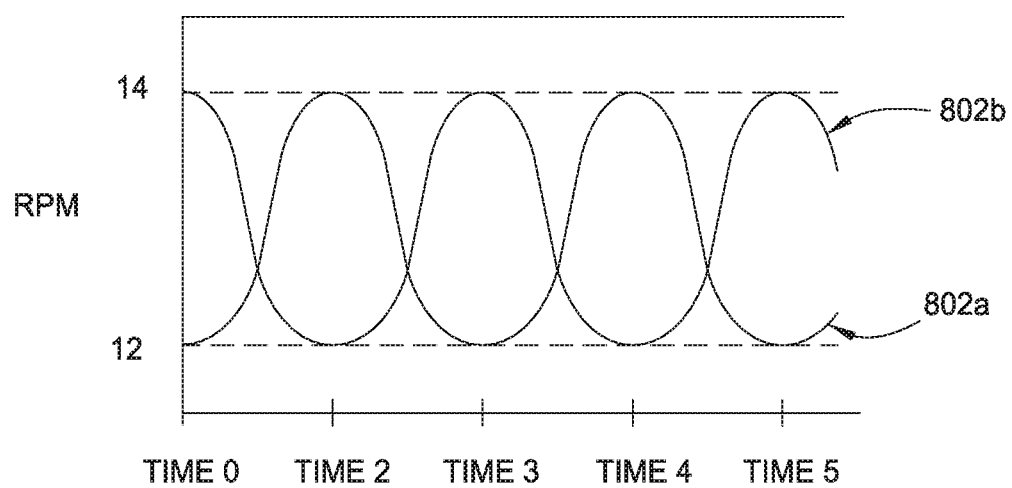

FIGS. 8A-8C illustrate techniques for increasing turbulent mixing in an array 800. Specifically, the induction factor is altered by changing the permanent pitch of the blades or the RPM of the rotor. "Permanent" pitch does not imply that the pitch of the blades never changes, though it does include that embodiment. Instead, in contrast to cyclic pitching, permanent pitch means that the pitch angle for a blade does not systematically change based on the orientation of the longitudinal axis 306 in relation to the ground plane 304. For example, during permanent pitching, the pitch angle for each blade may change based on time—e.g., linearly increasing or decreasing. Further, the pitch angle for each of the blades on a rotor may be at a maximum for a predefined period of time and then change to a minimum for another predefined period. However, the blade pitches change together and are independent of the location of the blades in the rotor plane 302 or their orientation to the ground plane 304.

The turbines illustrated in FIG. 8A create different wakes by using different permanent pitch for the blades or by changing the RPM of the blades. Regarding permanent pitch, the turbine at column 1 row 2 may pitch its blades into the wind which transfers less energy from the wind into the blades, thereby reducing the induction factor and the relaxation length. The turbine at column 2 row 2, however, may have a zero pitch angle and thus a higher induction factor and a greater relaxation length. Regarding the RPM of the rotor, the turbine at column 1 row 2 may have lower RPM value and a lower angular velocity which reduces the induction factor. The turbine at column 2 row 2, however, may have a higher RPM value which increases the induction factor. Much like in the previous figures, the neighboring turbines may be assigned different induction factors to increase the turbulent mixing. Further, the permanent pitch or RPM for each turbine may be assigned in a predefined manner as shown by array 800. In one embodiment, the turbine at column 2, row 3 has an induction factor that is smaller than the induction factor of each neighboring turbine in the same column or in the same row—i.e., the turbines at column 1, rows 2 and 4 and the turbines at row 4, columns 1 and 3. Alternatively or additionally, the induction factor may increase or decrease gradually. For example, in column 1, the turbine at row 2 may have a pitch angle of 10 degrees, the turbine at row 3 may have a pitch angle of 6 degrees, the turbine at row 4 may have a pitch angle of 3 degrees, and the turbine at row 5 may have a zero pitch angle. In rows 6-8, the trend may reverse and the pitch angles may gradually increase.

FIG. 8B illustrates a column from FIG. 8A at four different points in time. That is, FIG. 8B illustrates that one or more of the turbines in the array 800 may have induction factors that change dynamically according to a predefined rate of change. In the embodiment shown in FIG. 8B, four of the turbines in a column are changing according to time. At time 0, turbine 802a has a small induction factor (e.g., a minimum induction factor) while turbine 802b has a larger induction factor (e.g., a maximum induction factor). At time 1, the roles are reversed and turbine 802a has a larger induction factor than turbine 802b. In one embodiment, a turbine 802 transitions from the maximum induction factor to the minimum induction factor in a time period that is greater than, for example, the time of one revolution of the rotor.

FIG. 8C illustrates a graph showing the phase difference between the RPMs of the turbines 802. As shown, the turbines 802 transition between the maximum RPMs and minimum RPMs exponentially. However, the transition on each turbine 802 may occur linearly, by step functions, or in a combination of the transiting methods. When turbine 802*b* is at the maximum RPM value, turbine 802 is at a minimum RPM value. Although the turbines have a phase difference of 180 degrees, any phase may be used.

In one embodiment, the permanent pitch or RPMs of a turbine does not continuously change. Instead, the turbines 702 may maintain their current value for a certain period of time (e.g., one minute or one day) before transitioning to a different value—e.g., transitioning from 12 to 14 RPMs. For example, the graph shown in FIG. 8C may have periods where the RPMs remain constant. Nonetheless, the turbines 702 dynamically change based on this predefined rate of change.

Many modern wind turbines have both individual variable pitch and variable rotor speed systems. However, there may be specific wear related trade-offs associated with each system. For example, relying solely on the cyclic pitching system may cause excessive wear in the pitch bearings for certain wind turbine designs. Thus, one embodiment may be based on a combined control strategy which takes advantage of both variable rotor speed and pitch cycling in order to preserve lifetime operation of, for example, the pitch bearings.

Figure 9A:
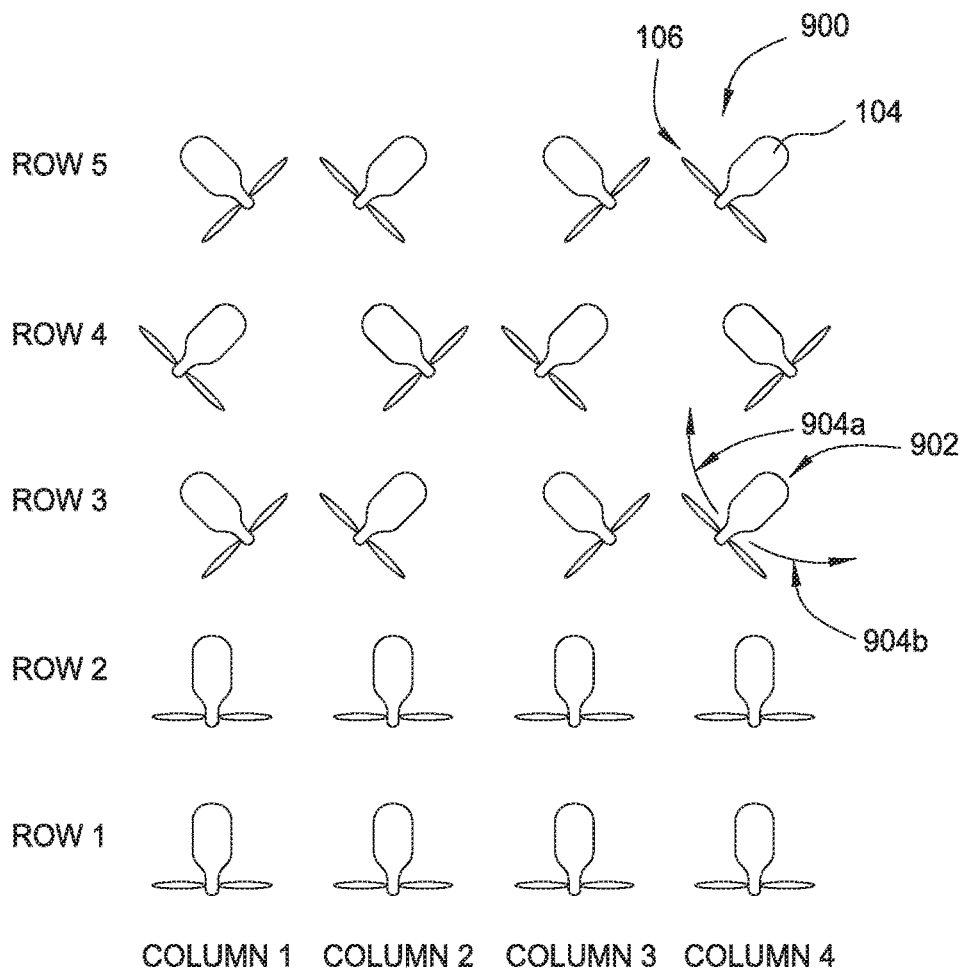
FIG. 9A-9B illustrate changing the yaw of wind turbine to increase turbulent mixing in a synchronized wind array, according to embodiments of the invention.
Figure 9B:
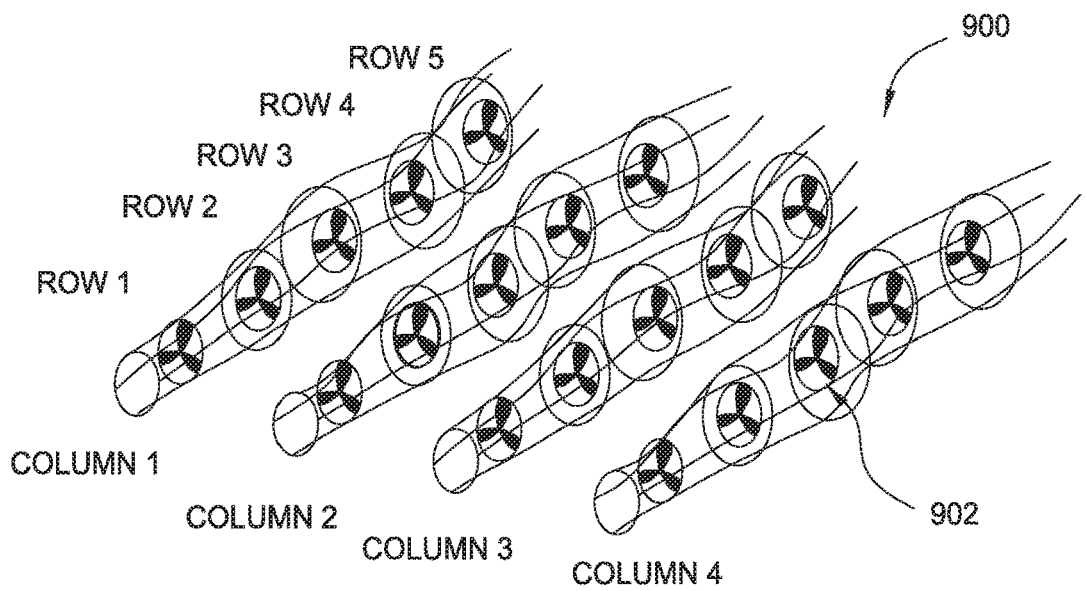

FIGS. 9A-9B illustrate using yaw to increase turbulent mixing. FIG. 9A is a top view of the array 900 which includes the rotor 106 and the nacelle 104. To increase the turbulent mixing in deeper rows, the first few rows of turbines (i.e., rows 1 and 2) may not have their yaws varied. The movement arrows 904 illustrate that the yaw on one or more of the turbines may change dynamically. The yaw motor 220 and a yaw drive 222 are suitable controllers for rotating the turbine 902 to a first maximum yaw (e.g., arrow 904*a*) and a second maximum yaw (e.g., arrow 904*b*). In one embodiment, the maximum yaw for a turbine may be greater than 10 degrees relative to the direction of the wind flowing into the rotor 106. Moreover, the yaw for turbine 902 may be different from the yaw of neighboring turbines in the same column and row. For example, if turbine 902 is the first maximum yaw, the turbine at column 3 row 3 may be at the second maximum yaw. Alternatively, the yaw difference between turbines on a same row or column may change gradually. For example, turbine 902 may be at the first maximum yaw, the turbine at column 4, row 4 may have zero yaw (i.e., the nacelle longitudinal axis 310 is parallel with the direction of the wind), and the turbine at column 4, row 5 may be at the second maximum yaw. Alternating the yaws increases the turbulent mixing and transfers more energy from the free layer into the wake.

In one embodiment, the yaw period—i.e., the time required to transition from the first to the second maximum yaws—for a turbine may be less than 100 seconds. In another embodiment, to minimize damage from constantly changing the yaw of the turbines, the yaw period may be greater than 100 seconds or greater than 200 seconds. Alternatively, the yaws may not constantly be changing. For example, turbine 902 may yaw to a first maximum and remain there for a certain period of time (e.g., a few minutes or even a day) before the yaw is then changed. Similarly, in one embodiment, the array 900 may be static. For example, each yaw may be fixed at the orientation illustrated in FIG. 9A.

The rotor plane 302 may be logically divided into two halves by a vector that is normal to the ground plane 304. Once the turbine has a yaw angle that is offset from the direction of the wind entering the rotor 106, one of the halves is facing into the wind while the other half is facing away from the wind. As shown by the turbine 902 in FIG. 9B, the half of the rotor plane 302 that is facing into the direction of the wind has a larger induction factor and wake expansion than the half that is facing away from the direction of the wind. The dynamic or static S-shaped wake profiles may encourage additional free layer airflow between the columns (i.e., the direction of the wind) and increase turbulent mixing.

In one embodiment shown in FIG. 5A, 6A-B, 7A, 8A-B or 9A-B, a portion of the turbines in the array can be designed or controlled such that the turbines' rotors spin a direction opposite that of a different turbine in the wind array. That is, this portion of the wind turbines may be operated with variable RPM, pitch and yaw in the desired combination, while the blades spin the in an opposite direction of a different wind turbine. For example, each directly neighboring wind turbine may have a rotor designed to spin in an opposite direction from the reference turbine, or each wind turbine in one column spins opposite that of the turbines in an adjacent, second column. This counter rotation may also increase turbulent mixing.

The different techniques for changing the induction factor for one or more wind turbines may also be applied for interpark interactions. Thus, even when there are significant distances between two wind arrays, the techniques described above could ensure that the energy taken out of the wind by the upwind wind park is transferred back into the wind by the time it reaches the downwind park.

CONCLUSION

Embodiments of the present invention provide various suitable techniques and apparatus for increasing turbulent mixing in the wake of at least one wind turbine. Doing so, increases efficiency of the turbine located in the wake. Turbulent mixing may be increased by changing the induction factor for a rotor by, for example, altering the pitch of the blades, the RPMs of the rotor, the direction of rotation, or the yaw of the nacelle. These techniques may be static or dynamically changing. Further, the different induction factors for a plurality of wind turbines may be synchronized according to a predetermined pattern to further increase turbulent mixing.

Although FIGS. 6A, 8A, 8B, and 9A show a pattern where the direct neighbors have alternating settings (e.g., alternating pitching, alternating rotors speeds, alternating yawing, and alternating rotor spin directions), the invention is not limited to such. For example, the all of the turbines in the same columns may have the same setting while all the turbines in the next column are different. Or the settings gradually change as illustrated in FIG. 6B. Or two wind turbines in the same column have the same setting while the next two turbines are different. Or the array may be divided into square sub-sections where the turbines in each sub-section have the same setting. One of ordinary skill in the art will recognize the different techniques of assigning different settings to turbines based on their relative locations in the array.

Moreover, even though the Figures illustrate periodically arranging or evenly spacing the wind turbines in an array, any other form or configuration is envisioned by this invention.

One of ordinary skill in the art will note that there are several other mechanisms which can affect the wake dynamics and turbulent mixing other than the ones listed herein.

Generally, the embodiments of the present invention are most effective at affecting the turbulent mixing at a distance of 1 to 5 diameters of the rotor turbine downstream of the turbine, although the invention is not limited to such.

While the foregoing is directed to embodiments of the present invention, other and further embodiments of the invention may be devised without departing from the basic scope thereof, and the scope thereof is determined by the claims that follow.

What is claimed is:

1. A wind turbine array, comprising:
a plurality of wind turbines which, for a given wind direction entering the wind turbine array, form a first set of wind turbines; and
a controller configured to change at least one operational parameter of blades on a first wind turbine and a second wind turbine in the first set in response to determining that the first wind turbine is in a wake created by a rotor of the second wind turbine, wherein respective values of the operational parameter for the first wind turbine and the second wind turbine are set according to respective predetermined settings, and wherein a difference between the respective values of the operational parameter remains constant, wherein variations to the operational parameter change induction factors of the blades on the first wind turbine and the second wind turbine, and wherein the predetermined settings are assigned to the first wind turbine and the second wind turbine based on a location of the first wind turbine relative to a location of the second wind turbine in the first set.

2. The wind turbine array of claim 1, wherein the operational parameter is at least one of: a pitch angle of a blade on the first and second wind turbines, a tip speed of the blade on the first and second wind turbines, and a yaw of rotors of the first and second wind turbines.

3. The wind turbine array of claim 1, wherein the location of the first wind turbine and the location of the second wind turbine are based on at least one of: a row, a column, and a diagonal line of the wind turbine array that are associated with the first and second wind turbines.

4. The wind turbine array of claim 3, wherein the first and second wind turbines are adjacently located.

5. The wind turbine array of claim 1, wherein the predetermined setting for the first wind turbine dynamically changes the operational parameter for at least one of the blades on the first wind turbine according to a predefined rate of change.

6. The wind turbine array of claim 5, wherein the predetermined setting for the second wind turbine dynamically changes the operational parameter for at least one of the blades on the second wind turbine according to the predefined rate of change.

7. The wind turbine array of claim 6, further comprising a different plurality of wind turbines located in the first set and upwind from the first and second wind turbines, wherein an operational parameter that changes an induction factor for at least one blade on each of the different plurality of wind turbines is not dynamically changing according to the predefined rate of change.

8. The wind turbine array of claim 1, wherein a rotor of at least one of the wind turbines in the first set rotates in a different direction relative to a rotor of at least one of the wind turbines in a second set which is arranged parallel to the first set relative to the given wind direction.

9. A method of optimizing a wind turbine array, comprising:
providing a plurality of wind turbines which, for a given wind direction entering the wind turbine array, form a first set of wind turbines; and
changing an operational parameter of blades on a first wind turbine and a second wind turbine in the first set in response to determining that the first wind turbine is in a wake created by a rotor of the second wind turbine, wherein respective values of the operational parameter for the first wind turbine and the second wind turbine are set according to respective predetermined settings, and wherein a difference between the respective values of the operational parameter remains constant, wherein variations to the operational parameter change induction factors of the blades on the first wind turbine and the second wind turbine, and wherein the predetermined settings are assigned to the first wind turbine and the second wind turbine based on a location of the first wind turbine relative to a location of the second wind turbine in the first set.

10. The method of claim 9, wherein the operational parameter is at least one of: a pitch angle of a blade on the first and second wind turbines, a tip speed of the blade on the first and second wind turbines, and a yaw of rotors of the first and second wind turbines.

11. The method of claim 9, wherein the location of the first wind turbine and the location of the second wind turbine are based on at least one of: a row, a column, and a diagonal line of the wind turbine array that are associated with the first and second wind turbines.

12. The method of claim 11, wherein the first and second wind turbines are adjacently located.

13. The method of claim 9, wherein the predetermined setting for the first wind turbine dynamically changes the operational parameter for at least one of the blades on the first wind turbine according to a predefined rate of change.

14. The method of claim 13, wherein the predetermined setting for the second wind turbine dynamically changes the operational parameter for at least one of the blades on the second wind turbine according to the predefined rate of change.

15. The method of claim 14, wherein a different plurality of wind turbines are located in the first set and are upwind from the first and second wind turbines, wherein an operational parameter that changes an induction factor for at least one blade on each of the different plurality of wind turbines is not dynamically changing according to the predefined rate of change.

16. A method of operating wind turbines in an array comprising a first wind turbine, the method comprising:
manipulating a pitch of a first blade of the first wind turbine according to a first blade pitch profile that causes the first blade to be at a first pitch angle at a first position of the first blade in a first rotor blade plane and at a second pitch angle at a second position of the first blade in the first rotor blade plane, the first and second positions being in fixed positions relative to each other; wherein the first pitch angle is less than the second pitch angle and wherein the first position is at a first clocked position in the first rotor blade plane, and wherein the second position is at a second clocked position in the first rotor blade plane; and
after manipulating the pitch of the first blade, rotating the first blade pitch profile so that the first and second positions rotate to different stations in the first rotor blade plane, wherein, after rotating, the pitch of the first blade at the first clocked position is greater than the first pitch angle, and the pitch of the first blade at the second clocked position is less than the second pitch angle.

17. The method of claim 16, further comprising, after rotating the first blade pitch profile, changing continuously the first blade pitch profile such that the first blade pitch profile rotates between the first blade pitch profile described in the step of manipulating the pitch of the first blade of the first wind turbine and the first blade pitch profile described in the step of rotating the first blade pitch profile.

18. The method of claim 16, wherein the first pitch angle is a minimum pitch angle and the second pitch angle is less than 10 degrees relative to a rotor plane of the first wind turbine.

19. The method of claim 16, wherein the first pitch angle is a minimum pitch angle and the second pitch angle is equal to or greater than 10 degrees and less than 180 degrees relative to a rotor plane of the first wind turbine.

20. The method of claim 16, wherein the wind turbine array includes a second wind turbine arranged in a column with the first wind turbine and the column is parallel to a given wind direction, and wherein the first wind turbine is upstream of the second wind turbine, the method further comprising:

manipulating a pitch of a second blade of the second wind turbine according to a second blade pitch profile that causes the second blade to be at the first pitch angle at a third position of the second blade in a second rotor blade plane and at the second pitch angle at a fourth position of the second blade in the second rotor blade plane, the third and fourth positions being in fixed positions relative to each other, and wherein the third and fourth positions are offset from the first and second positions of the first rotor blade in the first rotor blade plane by a fixed rotational angle as the first blade pitch profile rotates.

* * * * *